United States Patent [19]
Isaksson

[11] Patent Number: 6,034,808
[45] Date of Patent: Mar. 7, 2000

[54] MULTIPLE FUNCTION OPTICAL MODULE HAVING ELECTROMAGNETIC SHIELDING

[75] Inventor: Jan Isaksson, Taby, Sweden

[73] Assignee: Mitel Semiconductor AB, Järfälla, Sweden

[21] Appl. No.: 09/223,779

[22] Filed: Dec. 31, 1998

[30] Foreign Application Priority Data

Feb. 5, 1998 [GB] United Kingdom .................. 9802338
Dec. 23, 1998 [GB] United Kingdom .................. 9828570

[51] Int. Cl.$^7$ ........................................ G02F 1/07
[52] U.S. Cl. ........................ 359/245; 385/53; 385/92; 257/701; 359/248
[58] Field of Search ................... 359/111, 113, 359/180, 181, 189, 245, 247, 248; 385/53, 92; 257/701, 99

[56] References Cited

U.S. PATENT DOCUMENTS

| | | | |
|---|---|---|---|
| 5,005,939 | 4/1991 | Arvanitakis et al. | 385/53 |
| 5,150,257 | 9/1992 | Mohabbatizadeh et al. | 359/245 |
| 5,202,943 | 4/1993 | Carden et al. | 385/92 |
| 5,260,719 | 11/1993 | Maloney | 359/245 |
| 5,550,670 | 8/1996 | Zielinski et al. | 359/248 |
| 5,640,021 | 6/1997 | Lee et al. | 359/245 |

*Primary Examiner*—Loha Ben
*Attorney, Agent, or Firm*—Marks & Clerk

[57] ABSTRACT

A multiple function, electromagnetically shielded optical module employing flip chip bonded semiconductor lasers. The module positions a series of opto electronic dies on guides provided on an optical source. The dies may be simply stacked upon one another to form a passively aligned module. The shielding substantially reduces electrical cross talk and other sources of electromagnetic interference.

19 Claims, 3 Drawing Sheets

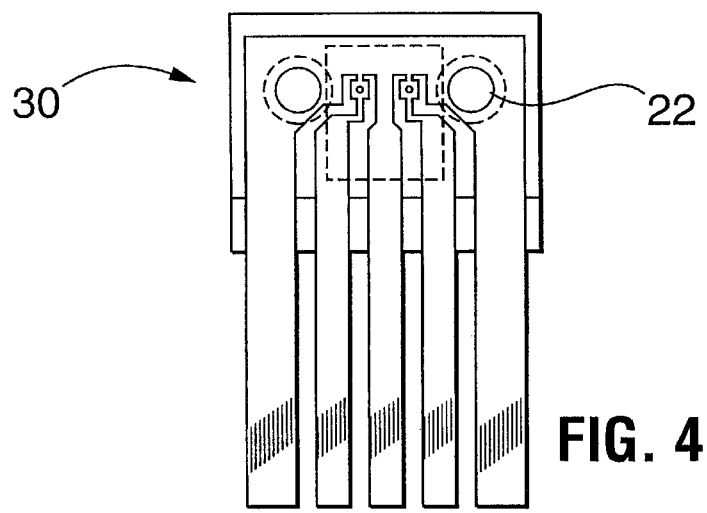
FIG. 4
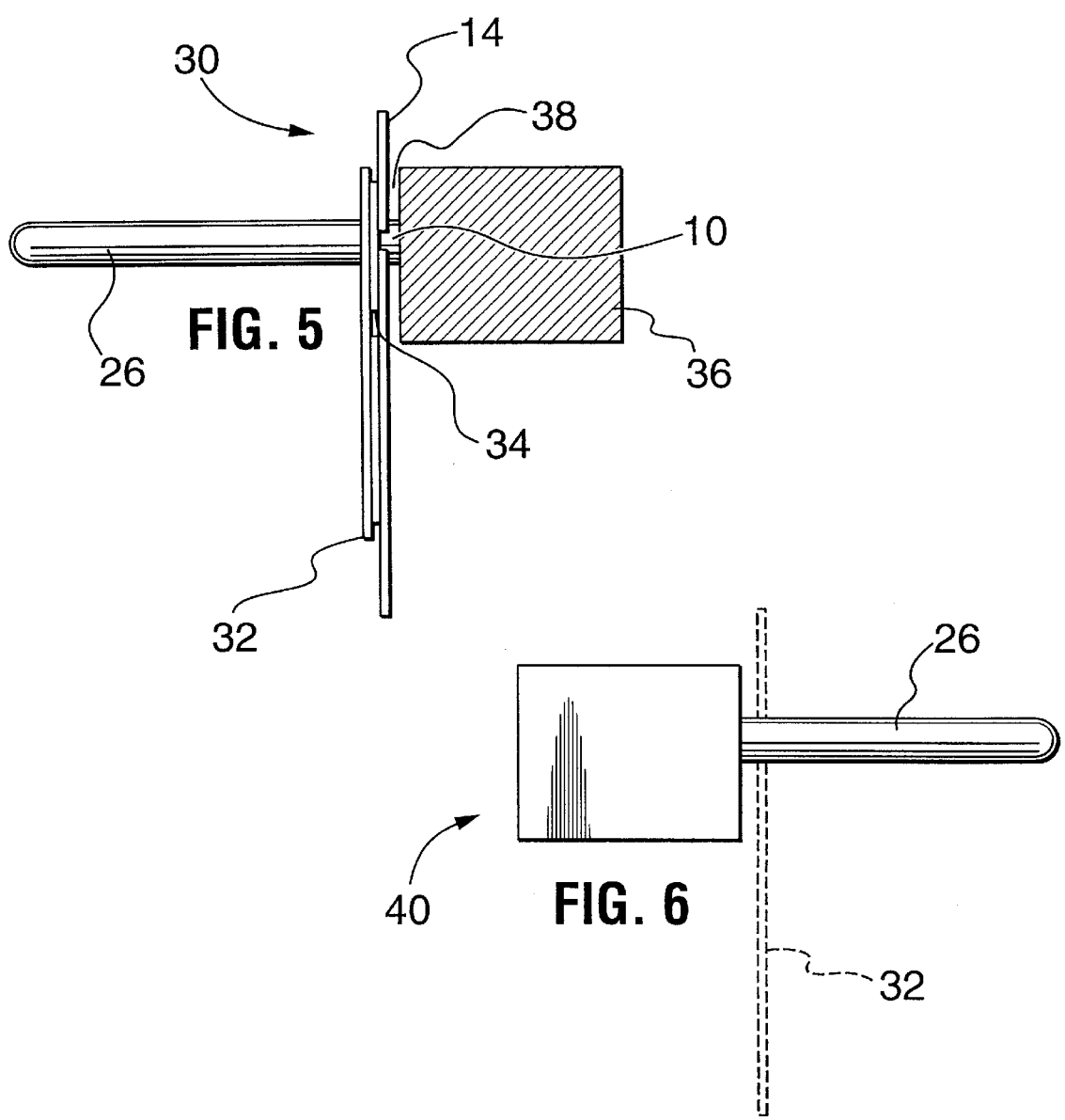
FIG. 5
FIG. 6

MULTIPLE FUNCTION OPTICAL MODULE HAVING ELECTROMAGNETIC SHIELDING

FIELD OF THE INVENTION

The present invention relates to a method and apparatus for an optical module capable of multiple functions and more particularly, the present invention relates to a stacked arrangement of optoelectronic dies having the advantage of being shielded against electromagnetic interference.

BACKGROUND OF THE INVENTION

In the prior art, there have been attempts to maximize the functioning of optical components in order to increase the efficiency of the circuits in which they are integrated. Typically, these efforts have lead to engineering, manufacturing or design complications, all of which contribute to cost increases and ineffective use of valuable research and development time. In attempting to stack or otherwise increase the number of components, electromagnetic interference has become a problem with which designers have had to contend.

It would be most desirable to have a method for the fabrication of a multiple functioning optical module which could be readily and expeditiously assembled and shielding easily applied. Such shielded units could then be employed in a circuit. The present invention provides an optical module satisfying these requirements and a method of forming such a module.

SUMMARY OF THE INVENTION

In accordance with one aspect of the present invention, there is provided a multiple function optical, comprising:

a plurality of opto electronic die members, each member of the members having a frame for carrying an opto electronic device, each device for performing a function different from another device of the members;

an optical source having guide means;

shielding means for shielding opto electronic devices from electromagnetic interference; and alignment means on the frame for aligning the die members on the guide means of the optical source, whereby the die members may be stacked on the guide means.

The module as delineated herein provides significant advantages over currently used arrangements in that the module may be customized for certain applications desired by the user. To this end, optical dies having completely different functions may be stacked one upon the other. Selection of the die will depend on the functions sought by the module designer.

Of particular convenience is the feature of passive alignment of the dies on the optical source. As is well known in the art, alignment is typically the most labour intensive aspect in the manufacture of optical components. By making use of framed optical die components together with a guide system associated with the optical source, as one possibility, the alignment procedure is greatly simplified while alignment precision remains uncompromised.

Duplex, coupler and multiple wavelength modules inter alia may be created using the technology set forth herein and thus, in a further aspect of the present invention, there is provided a multiple function optical module, comprising:

a plurality of opto electronic die members, each member of the members having a frame for carrying an opto electronic device, each device for performing a function different from another device of the members;

an optical source having guide means;

a substrate for receiving the opto electronic die members including shielding means for shielding opto electronic devices from electromagnetic interference; and alignment means on the frame for aligning the die members on the guide means of the optical source, whereby the die members may be stacked on the guide means.

As examples, modules may be formed to stack in alignment optoelectronic dies each for emitting a different wavelength. Further, the module may incorporate detector dies, each for detecting a different frequency.

For duplex operations, the module will include both transmitting and receiving dies in any number. Both passive and active components may be used and the modules integrated into a larger circuit.

In accordance with a further aspect of one embodiment of the present invention, there is provided a method of forming a multiple function module, comprising:

providing a plurality of opto electronic die members, each member of the members having a frame for carrying an opto electronic device, the device for performing a function different from another device of the members;

providing an optical source having guide means; and providing alignment means on the frame for aligning the die members on the guide means of the optical source, whereby the die members may be stacked on the guide means to provide an optical module having a variety of functions.

Having thus generally described the invention, reference will now be made to the accompanying drawings illustrating preferred embodiments.

BRIEF DESCRIPTION OF THE DRAWINGS

FIG. 4 is a plan view of an alternate embodiment of the present invention where a stacked assembly includes a shielding member for shielding electromagnetic interference;

FIG. 5 is a side view of FIG. 4; and

FIG. 6 is a side view of a substrate having shielding capability.

Similar numerals employed in the text denote similar elements.

DETAILED DESCRIPTION OF THE PREFERRED EMBODIMENTS

Figure 1:
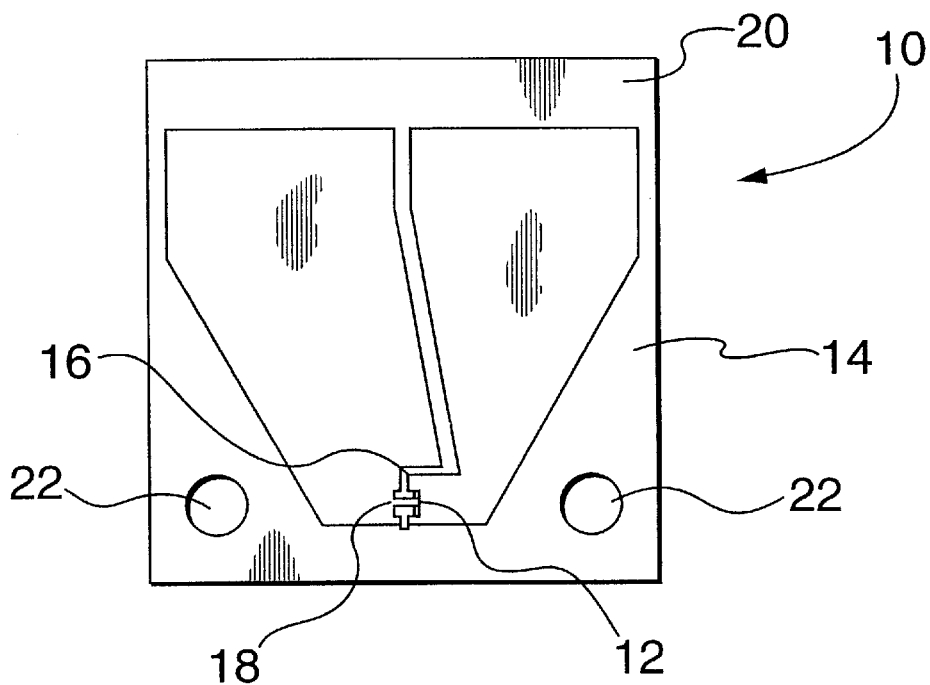
FIG. 1 is a plan view of the lead frame for receiving an optical die.

Referring now to the drawings, FIG. 1 illustrates a first example of the optical die, generally denoted by numeral 10, for use in the present invention. A laser diode 12 is provided and a carrier or lead frame 14 is connected to the substrate and to laser diode 12 via contact pads 16 and 18. This configuration permits flip-chip bonding of laser diode to the pads while permitting the surface emitting laser to provide a collimated beam in a direction away from the plane of the contacts. As is known, the end strip 20 is removed after the laser has been attached and the package otherwise completed in order to isolate the two pads 16 and 18.

Lead frame 14 also has apertures 22 which are precisely aligned in relation to the bonding pads 16, 18. The apertures 22 facilitate passive alignment with guides on the optical source discussed hereinafter.

Figure 2:
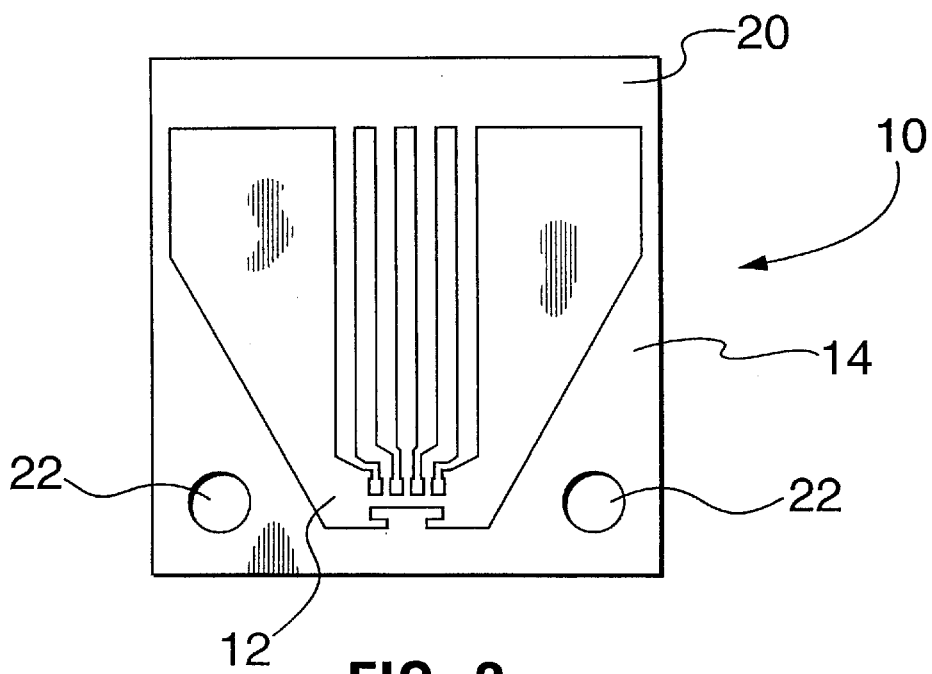
FIG. 2 is a plan view of the lead frame for receiving an optical die according to a further embodiment.

FIG. 2 illustrates a further optical die including a diode array 12'. It will be understood that the dies shown are only examples and optoelectronic component choice will depend on the requirements of the user.

Figure 3:
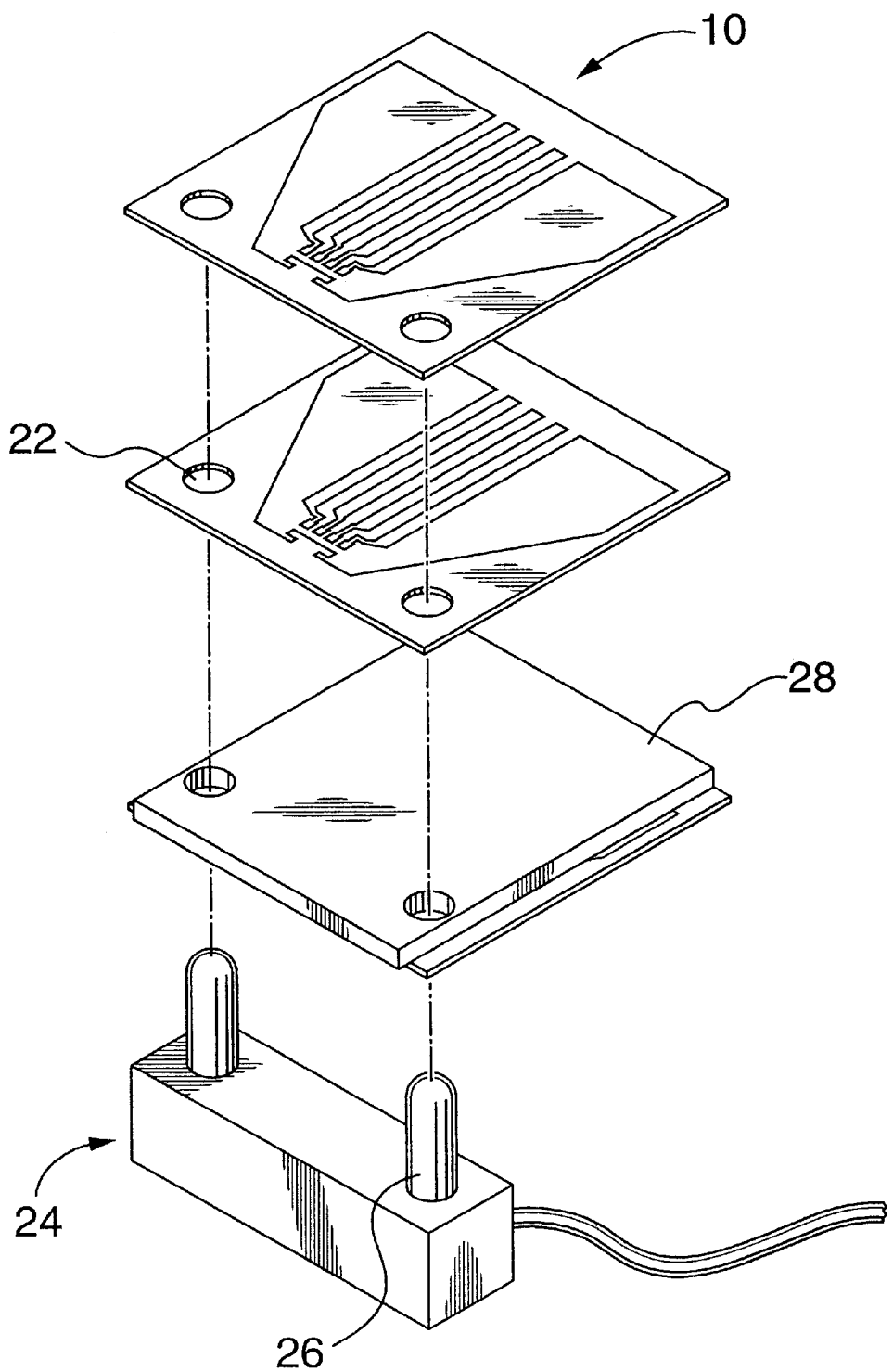
FIG. 3 is an exploded view illustrating the disposition of the dies on the optical source.

FIG. 3 is an exploded view of a stacked module. The optical source 24 may be any suitable source, of which there is an abundance in the prior art, useful with dies and accordingly detailed description will be obviated. The source 24 will include guides 26, shown in the example as projections, which may be machined or otherwise attached to source 24 as shown.

Guides 26 receive dies 10 at apertures 22 to ensure precise alignment between the optical device, in the example diodes 14, and optical fibers, broadly denoted by numeral 28. The dies each may perform discreet functions as discussed supra to thus provide a multiple function optical module allowing the designer to select which functions are useful in a given situation. As an alternative, the module shown in FIG. 3 may optionally include passive elements 28 such as optical mirrors. In this arrangement, the active elements (optical devices connected to the dies 10) may alternate with passive elements 28. Further, a series of elements 28 may be interposed with dies 10. Other combinations of elements are also possible. The module of FIG. 3 may also be incorporated into an integrated circuit (not shown) or mounted to circuit board (not shown).

Referring now to FIGS. 4 and 5, shown is an assembled module, globally denoted by numeral 30. The module 30 provides metal shielding 32 for shielding electromagnetic interference i.e. crosstalk, stray voltage etc., from damaging the module. The shielding 32 may comprise a metal material from the copper, iron, or aluminum families and is desirably encapsulated within a film such as polyethylene film. A typical example of suitable film to achieve this goal is polyethylene terephthalate film. A protective spacer 34 is interposed between metal shield 32 and frame 14. The protective spacer spaces the shield 32 in a co-axial and parallel spaced apart plane from frame 14. The material of which the protective spacer 34 is made will comprise suitable insulating materials, typical of which is glass, commonly used in the semiconductor art. A heat sink 36 substantially surrounds the optical portion of the module and is maintained from the lead frame 14 by suitable spacing/mounting material, an example of which may be a suitable adhesive. The area in which the adhesive may be deposited is generally denoted by numeral 38.

Turning to FIG. 6, shown is a substrate 40, having guide pin 26. In this embodiment, the substrate 40 typically carries a lead frame, such as those discussed herein previously with respect to FIGS. 1 through 5. In this arrangement, the guide pin(s) may comprise stainless steel with the substrate comprising copper or a member of the copper family, iron family or aluminum family. The material has been found to be effective in substantially reducing electrical cross talk to very low levels. The lead frame, shown in dashed lines in the figure, is mounted in immediate adjacency to the substrate. This ensures that shielding is achieved and that cross talk is significantly reduced.

Although specific embodiments of the invention have been discussed it will be appreciated that the invention is subject to substantial variation without departing from the spirit, nature or scope of the described and claimed invention.

I claim:

1. A multiple function optical module, comprising:

a plurality of opto electronic die members, each member of said members having a frame for carrying an opto electronic device, each said device for performing a function different from another device of said members;

an optical source having guide means;

shielding means for shielding opto electronic devices from electromagnetic interference; and alignment means on said frame for aligning said die members on said guide means of said optical source, whereby said die members may be stacked on said guide means.

2. The optical module as set forth in claim 1, wherein said optoelectronic die members include active optical components and passive optical components.

3. The optical module as set forth in claim 2 wherein said shielding means comprises a metal film.

4. The optical module as set forth in claim 3, wherein said metal film comprises a material selected from the iron family, the copper family or the aluminum family.

5. The optical module as set forth in claim 3, wherein said metal film is encapsulated in a polyethylene film, comprising polyethylene terephthalate.

6. The optical module as set forth in claim 2, wherein said shielding means is spaced from said opto electronic die members in a coaxial spaced apart plane by an electromagnetic insulator.

7. The optical module as set forth in claim 1, wherein said module includes an opto electronic die receiving member for receiving a wavelength and a transmitting member for transmitting a wavelength.

8. The optical module as set forth in claim 7, wherein said receiving member comprises an array receiver and said transmitter comprises an array transmitter.

9. The optical module as set forth in claim 1, wherein said receiving member and said transmitting member are in alternating relation.

10. The optical module as set forth in claim 9, wherein said receiving member comprises a single receiver and said transmitter comprises a single transmitter.

11. The optical module as set forth in claim 1, wherein each said opto electronic die member includes at least one of a flip chip bonded vertical cavity surface emitting diode, detector diode or micro cavity diode.

12. The optical module as set forth in claim 1, wherein said alignment means comprises apertures in said die members.

13. The optical module as set forth in claim 1, wherein said passive optical components include dichroic mirrors.

14. A multiple function optical module, comprising:

a plurality of opto electronic die members, each member of said members having a frame for carrying an opto electronic device, each said device for performing a function different from another device of said members;

an optical source having guide means;

a substrate for receiving said opto electronic die members including shielding means for shielding opto electronic devices from electromagnetic interference; and alignment means on said frame for aligning said die members on said guide means of said optical source, whereby said die members may be stacked on said guide means.

15. The optical module as set forth in claim 14, wherein said substrate comprises a copper substrate.

16. The optical module as set forth in claim 15, wherein said copper substrate includes stainless steel guide pins.

17. A method of forming a multiple function module, comprising:

provide a plurality of opto electronic die members, each member of said members having a frame for carrying an opto electronic device, each said device for performing a function different from another device of said members;

providing an optical source having guide means; and providing alignment means on said frame for aligning said die members on said guide means of said optical source, whereby said die members may be stacked on said guide means to provide an optical module having a variety of functions.

18. The method as set forth in claim 17, further including the step of simultaneously transmitting and detecting wavelengths with said module.

19. The method as set forth in claim 18, further including the step of simultaneously detecting a plurality of wavelengths of different frequency.

* * * * *